(12) United States Patent
Oishi (10) Patent No.: US 11,441,939 B2
(45) Date of Patent: Sep. 13, 2022

(54) HOME ELECTRIC APPLIANCE WITH HEATING FUNCTION

(71) Applicant: Mitsubishi Electric Corporation, Tokyo (JP)

(72) Inventor: Satoko Oishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 16/971,496

(22) PCT Filed: Feb. 25, 2019

(86) PCT No.: PCT/JP2019/007038
§ 371 (c)(1),
(2) Date: Aug. 20, 2020

(87) PCT Pub. No.: WO2019/172002
PCT Pub. Date: Sep. 12, 2019

(65) Prior Publication Data
US 2020/0386608 A1 Dec. 10, 2020

(30) Foreign Application Priority Data
Mar. 5, 2018 (JP) .............................. JP2018-038480

(51) Int. Cl.
*G01G 19/52* (2006.01)
*A01K 29/00* (2006.01)

(52) U.S. Cl.
CPC ........... *G01G 19/52* (2013.01); *A01K 29/005* (2013.01)

(58) Field of Classification Search
CPC ............................. A01K 29/005; G01G 19/52
See application file for complete search history.

(56) References Cited

U.S. PATENT DOCUMENTS

| 5,455,404 A | 10/1995 | Sakai et al. |
| 2004/0134903 A1 | 7/2004 | Chun |

FOREIGN PATENT DOCUMENTS

| CN | 1517600 A | 8/2004 |
| EP | 1437921 A2 | 7/2004 |

(Continued)

OTHER PUBLICATIONS

International Search Report of the International Searching Authority dated Apr. 23, 2019 for the corresponding International application No. PCT/JP2019/007038 (and English translation).

(Continued)

*Primary Examiner* — Randy W Gibson
(74) *Attorney, Agent, or Firm* — Posz Law Group, PLC (57) ABSTRACT

There is provided a home electric appliance with which a weight of a measurement target object may be easily and stably measured without requiring a special device. The home electric appliance is a home electric appliance, a top part of a main body of which becomes warmer as a result of a basic operation, the home electric appliance including: a weight measurement unit configured to measure a weight of a measurement target object placed on the top part, and to output measurement information; and a controller configured to perform a weight detection operation of detecting the weight of the measurement target object based on the measurement information from the weight measurement unit. The top part includes a back surface that faces an inside of the main body, and the weight measurement unit is installed on the back surface of the top part.

11 Claims, 7 Drawing Sheets

(56) References Cited

FOREIGN PATENT DOCUMENTS

| JP | S62-156838 U | 10/1987 |
|----|----|----|
| JP | H07-219058 A | 8/1995 |
| JP | 2004-219058 A | 8/2004 |
| JP | 2006-073347 A | 3/2006 |
| JP | 2007-330200 A | 12/2007 |
| JP | 2012-055942 A | 3/2012 |
| JP | 2014-032004 A | 2/2014 |
| JP | 2014-046120 A | 3/2014 |
| JP | 2016-151383 A | 8/2016 |
| JP | 2016-184437 A | 10/2016 |
| KR | 10-0618230 B1 | 9/2006 |

OTHER PUBLICATIONS

Office Action dated Jun. 2, 2021 issued in corresponding CN patent application No. 201980016138.1 (and English translation).
Extended European Search Report dated Mar. 19, 2021, issued in corresponding European Patent Application No. 19765047.6.
Japanese Office Action dated May 11, 2021, issued in corresponding JP Patent Application No. 2020-504932 (and English Machine Translation).
Office Action dated Dec. 10, 2021, issued in corresponding CN Patent Application No. 201980016138.1 (and English Machine Translation).

HOME ELECTRIC APPLIANCE WITH HEATING FUNCTION

CROSS REFERENCE TO RELATED APPLICATION

This application is a U.S. national stage application of PCT/JP2019/007038 filed on Feb. 25, 2019, which claims priority to Japanese Patent Application No. 2018-038480 filed on Mar. 5, 2018, the contents of which are incorporated herein by reference.

TECHNICAL FIELD

The present invention relates to a home electric appliance such as a heating/cooking device and a refrigerator capable of measuring a weight of a measurement target object.

BACKGROUND ART

Nowadays, with a stressful society and an aging society with fewer children as a background, a shift is taking place to a society where humans turn to pets for comfort or treat pets as family members. Typical pets include cats, dogs, rabbits, hamsters, goldfish, and weasel (ferrets), for example.

Moreover, a relationship between humans and pets is changing from a relationship of "keeping, being kept" as a pet animal to a relationship of "family, partners". Pets are being more and more often referred to as "companion animals".

As life expectancy of pets increases, people are becoming more conscious about pets' health. To keep a pet healthy, it is important to grasp a change in the state or behavior of the pet at an early stage. To this end, current state and behavior of a pet have to be accurately grasped. As a health barometer for accurately grasping the state and behavior of a pet, a weight may be cited.

Particularly in relation to cats, obesity is becoming a problem due to cats being more often kept completely indoors, and also, due to improved pet food, and there is a great need to easily grasp the weight of a cat. Methods of measuring the weight of a cat at home include a method in which a person such as an owner puts the pet on a weight scale and reading the value displayed on the weight scale, and a method in which a person such as an owner gets on a weight scale while holding the pet and measures a weight by subtracting the weight of the person from a displayed value. However, in the former case, there is a problem that the weight cannot be accurately measured when the pet moves. There is also a problem that a person has to put the pet on the weight scale, and that the method is burdensome. In the latter case, there is a problem that a cat, especially one that hates being held, may twitch violently, making it impossible to accurately measure the weight.

For example, Patent Literature 1 proposes an automatic weight measurement system for pets, with which the burden of putting a pet on a weight scale may be eliminated by having a weight measurement unit placed under a place where a pet stays, such as a pet toilet or a pet's bed.

CITATION LIST

Patent Literature

Patent Literature 1: Japanese Unexamined Patent Application Publication No. 2007-330200

SUMMARY OF INVENTION

Technical Problem

The automatic weight measurement system for pets described in Patent Literature 1 has a problem that, because the time when a pet is staying still in a toilet is quite short, the weight cannot be stably measured. Furthermore, cats in particular tend to like high places, and there is a problem that the weight measurement unit cannot be disposed in such places.

The present invention has been made in view of such circumstances and is aimed at providing a home electric appliance with which a weight of a measurement target object may be easily and stably measured without requiring a special device.

Solution to Problem

A home electric appliance according to an embodiment of the present invention is a home electric appliance, a top part of a main body of which becomes warmer as a result of a basic operation, the home electric appliance including: a weight measurement unit configured to measure a weight of a measurement target object placed on the top part, and to output measurement information; and a controller configured to perform a weight detection operation of detecting the weight of the measurement target object based on the measurement information from the weight measurement unit, where the top part includes a back surface that faces an inside of the main body, and the weight measurement unit is installed on the back surface of the top part.

Advantageous Effects of Invention

With the home electric appliance according to the embodiment of the present invention, the weight measurement unit configured to measure the weight of a measurement target object placed on the top part is provided, and thus, the weight of the measurement target object may be easily and stably measured without requiring a special device.

DESCRIPTION OF EMBODIMENTS

Hereinafter, embodiments of the present invention will be described with reference to the drawings. Note that in the following drawings including FIG. 1, the relationship of sizes of structural parts may differ from that of actual ones. Furthermore, in the following drawings including FIG. 1, those denoted by same reference signs are same or equivalent elements, and this applies throughout the entire specification. Moreover, modes of structural elements described in the entire specification are merely examples and are not restrictive.

First, a home electric appliance according to the present invention will be described. The home electric appliance according to the present invention is an appliance that is normally provided in a general home, and is a collective term including a microwave oven, a convection microwave oven, a rice cooker, an IH cooking heater, a refrigerator, and the like. However, the home electric appliance according to the present invention is not limited to those mentioned above, and the home electric appliance according to the present invention includes any home electric appliance, a top part of which gets warm. That a top part gets warm means that a temperature of the top part is increased as a result of a basic operation of the home electric appliance. Furthermore, embodiments are described taking a cat as a representative example, but pets include dogs, rabbits, hamsters, goldfish, weasels (ferrets) and other animals.

Embodiment 1

Figure 1:
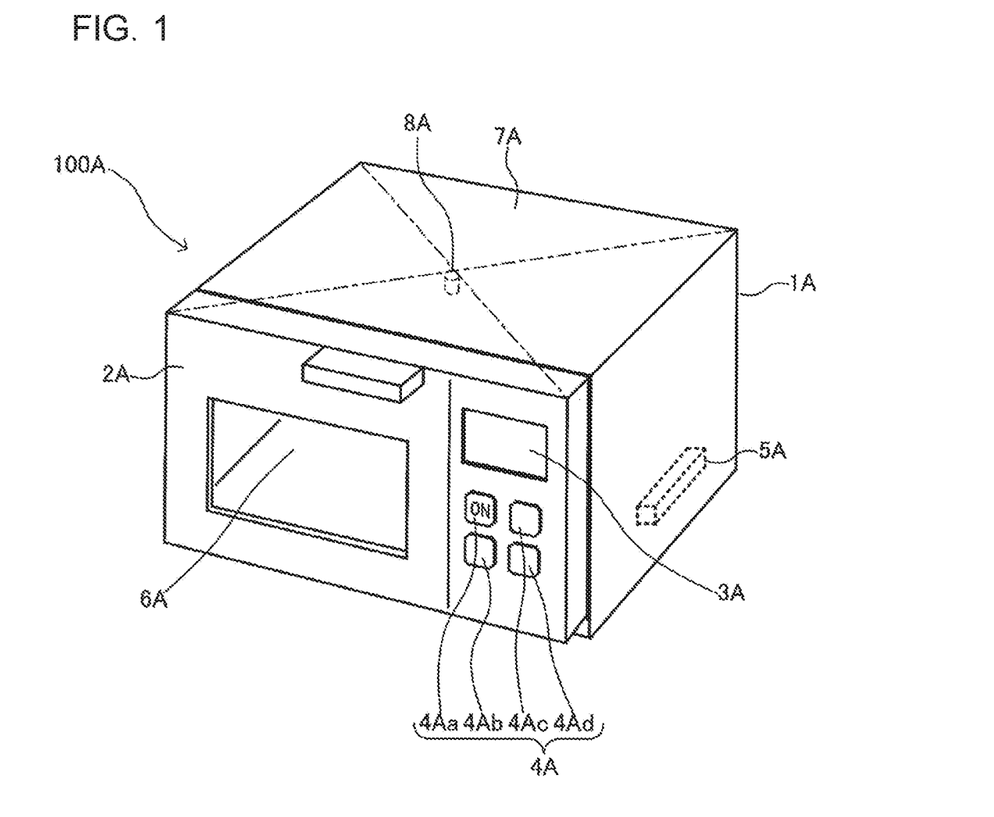
FIG. 1 is a schematic perspective view schematically showing an example of a configuration of a heating/cooking device according to Embodiment 1 of the present invention.
Figure 2:
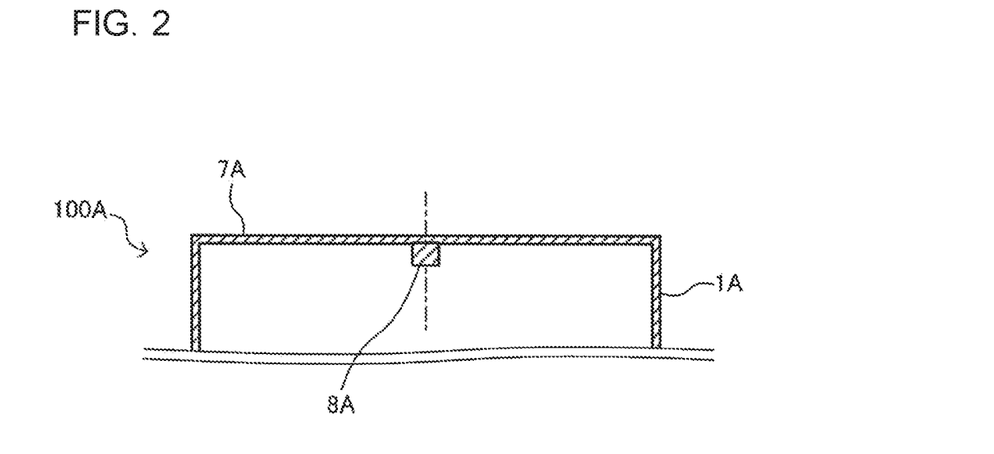
FIG. 2 is a cross-sectional view schematically showing a cross-sectional configuration of a part of the heating/cooking device according to Embodiment 1 of the present invention.

FIG. 1 is a schematic perspective view schematically showing an example of a configuration of a heating/cooking device 100A according to Embodiment 1 of the present invention. FIG. 2 is a cross-sectional view schematically showing a cross-sectional configuration of a part of the heating/cooking device 100A. In the following, the heating/cooking device 100A will be described with reference to FIGS. 1 and 2. The heating/cooking device 100A is a microwave oven or a convection microwave oven that is one of home electric appliances according to the present invention.

As shown in FIG. 1, the heating/cooking device 100A includes a main body 1A, and a door 2A covering a front side of the main body 1A in a manner allowing the main body 1A to be opened/closed. Furthermore, a display unit 3A configured to display various pieces of information, and an operation unit 4A configured to receive various operations are installed on a right, as viewed on the page, of the door 2A. The display unit 3A and the operation unit 4A are connected to a controller 5A that is built in the main body 1A. The operation unit 4A is provided with various operation keys including a start key 4Aa, a cancel key 4Ab, a menu selection key 4Ac, and a heating time key 4Ad.

A heating compartment 6A is formed inside the main body 1A. An opening through which a heating target object can be put in and taken out is formed at a front side of the heating compartment 6A. An entire front side of the main body 1A including the opening is opened and closed by the door 2A. Furthermore, the main body 1A includes a top part 7A. A weight measurement unit 8A is installed on a lower side of the top part 7A, that is, a back surface, of the top part 7A, positioned inside the main body 1A.

As shown in FIGS. 1 and 2, the weight measurement unit 8A is installed at a center of the back surface of the top part 7A. The weight measurement unit 8A measures a weight of a measurement target object placed on the top part 7A. Measurement information from the weight measurement unit 8A is transmitted to the controller 5A. The weight measurement unit 8A may be a weight sensor. Note that the weight measurement unit 8A does not have to be installed at exactly the center of the back surface of the top part 7A.

A magnetron as a high-frequency generation unit, and a high-voltage power generation unit configured to supply drive power to the magnetron are installed inside the main body 1A. Furthermore, as means for heating the heating compartment 6A, a high-frequency heating unit that uses high frequency, and a radiation heating unit that uses a heater are provided. High-frequency heating refers to a heating method of heating a heating target object by high frequency, according to which high frequencies are excited by the magnetron, propagated through a waveguide, and radiated to the heating compartment 6A via a rotary antenna that is driven by an antenna motor disposed on a lower part of the heating compartment 6A. Radiation heating refers to a heating method of heating a heating target object by increasing a temperature of the heating compartment 6A by a heater that is installed on an upper part or a lower part of the heating compartment 6A.

The controller 5A controls operation of the magnetron and the heater on the basis of operation of the operation unit 4A. Furthermore, the controller 5A detects a weight of a measurement target object on the basis of measurement information from the weight measurement unit 8A. The controller 5A is hardware such as a circuit device, or software that is executed on an arithmetic device such as a CPU.

Figure 3:
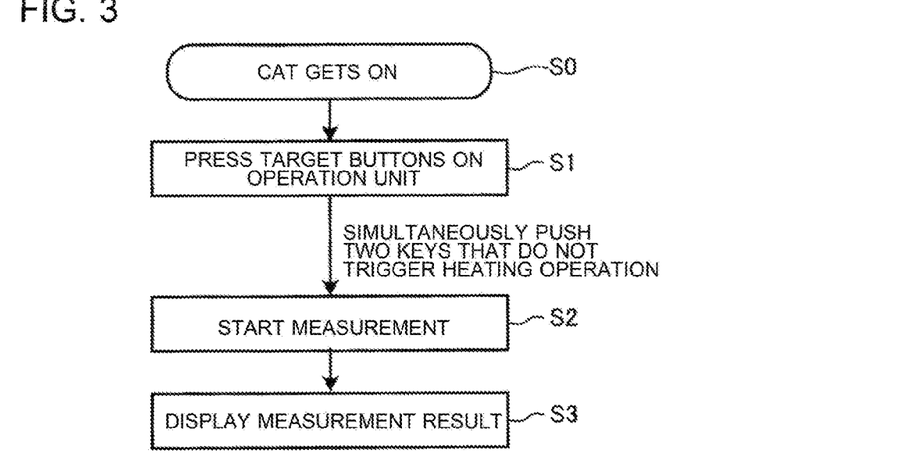
FIG. 3 is a flowchart showing a flow of processes at a time of a weight detection operation by the heating/cooking device according to Embodiment 1 of the present invention.
Figure 4:
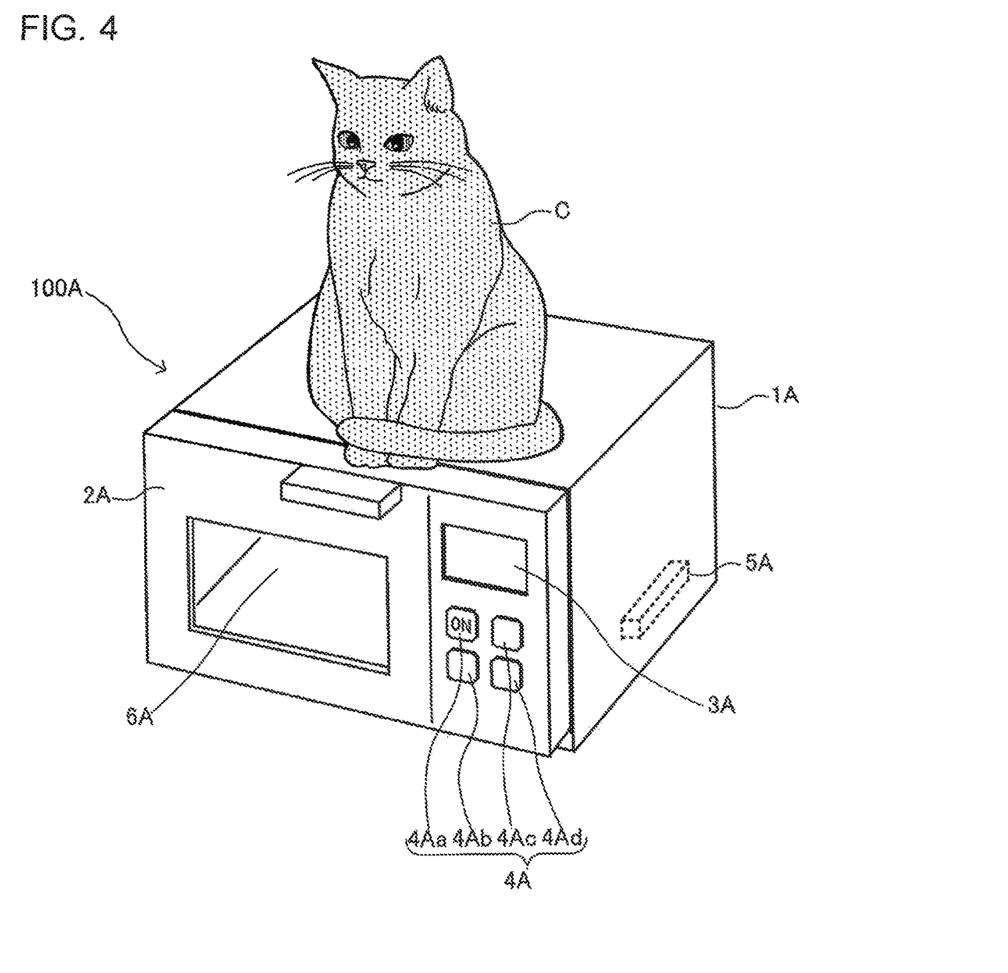
FIG. 4 is a schematic diagram schematically giving an idea of the weight detection operation by the heating/cooking device according to Embodiment 1 of the present invention.

A weight detection operation by the heating/cooking device 100A will be described. FIG. 3 is a flowchart showing a flow of processes at a time of the weight detection operation by the heating/cooking device 100A. FIGS. 4 to 7 are schematic diagrams schematically giving an idea of the weight detection operation by the heating/cooking device 100A. FIG. 4 corresponds to step S0 in FIG. 3, FIG. 5 to step S1 in FIG. 3, FIG. 6 to step S2 in FIG. 3, and FIG. 7 to step S3 in FIG. 3.

Here, a case where the heating/cooking device 100A performs the weight detection operation in response to a user instruction will be described. The heating/cooking device 100A is assumed to start the weight detection operation with simultaneous operation of two keys on the operation unit 4A, such as the cancel key 4Ab and the heating time key 4Ad, as a trigger.

(Step S0 in FIG. 3, FIG. 4)

A cat C gets on the top part 7A of the heating/cooking device 100A. The cat C likes warm and high places. Accordingly, the cat C voluntarily gets on the top part 7A of the heating/cooking device 100A.

Figure 5:
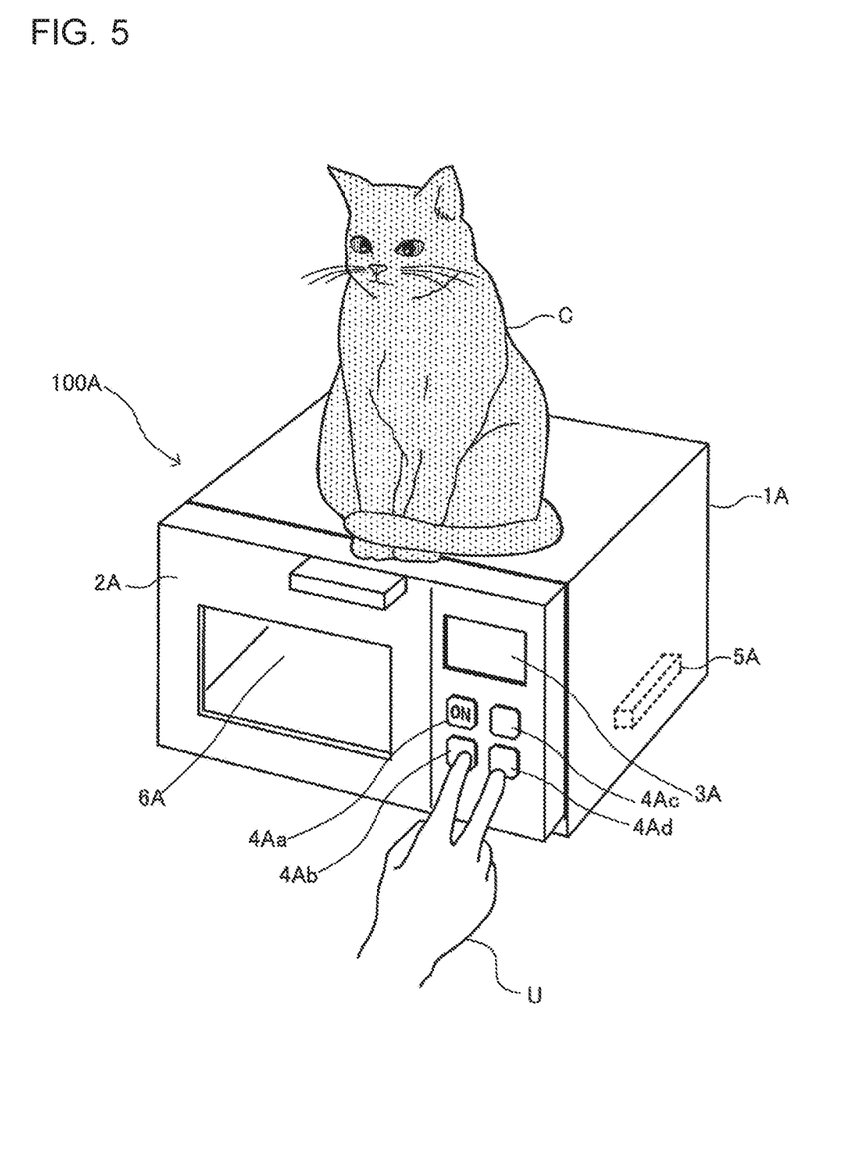
FIG. 5 is a schematic diagram schematically giving an idea of the weight detection operation by the heating/cooking device according to Embodiment 1 of the present invention.

(Step S1 in FIG. 3, FIG. 5)

After confirming that the cat C is on the top part 7A of the heating/cooking device 100A, a user operates the cancel key 4Ab and the heating time key 4Ad at the same time. That is, a user U presses the cancel key 4Ab and the heating time key 4Ad at the same time.

Figure 6:
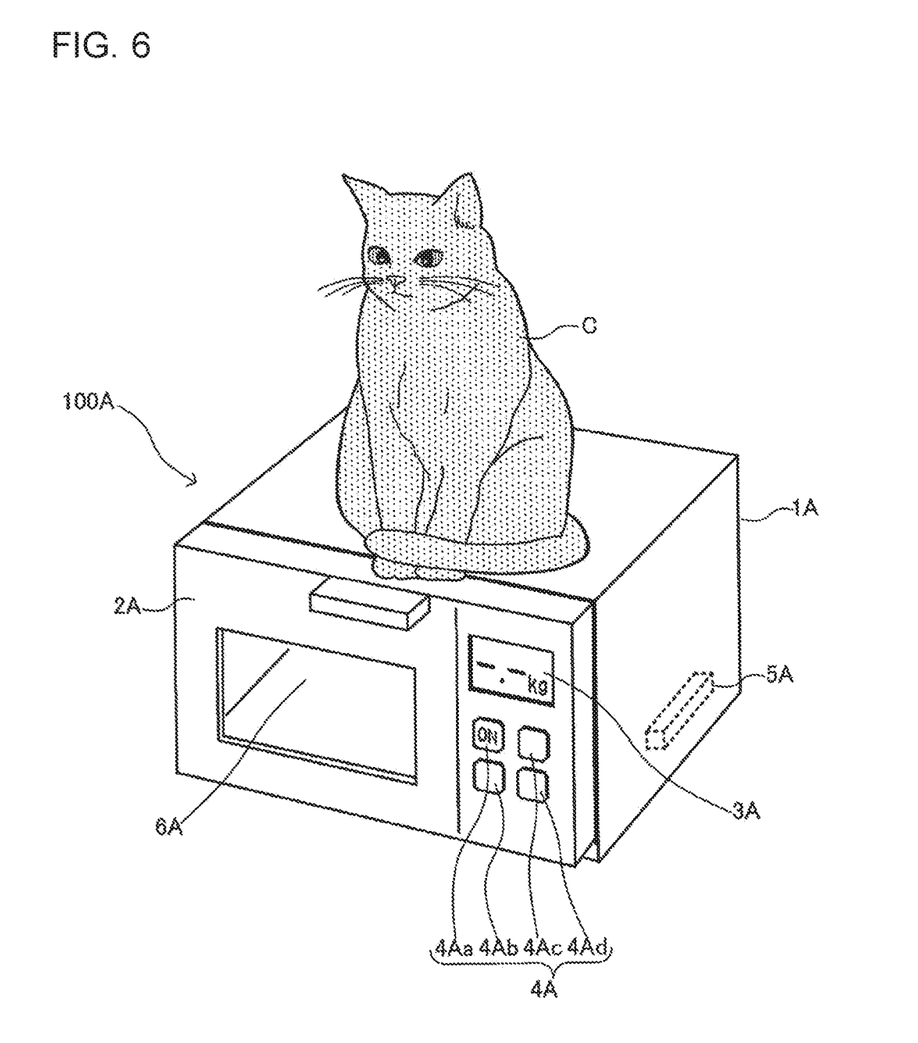
FIG. 6 is a schematic diagram schematically giving an idea of the weight detection operation by the heating/cooking device according to Embodiment 1 of the present invention.

(Step S2 in FIG. 3, FIG. 6)

The heating/cooking device 100A starts the weight detection operation, taking the simultaneous operation of the cancel key 4Ab and the heating time key 4Ad as the trigger. During the weight detection operation, the controller 5A may display, on the display unit 3A, an image or a text indicating that the weight detection operation is being performed.

Figure 7:
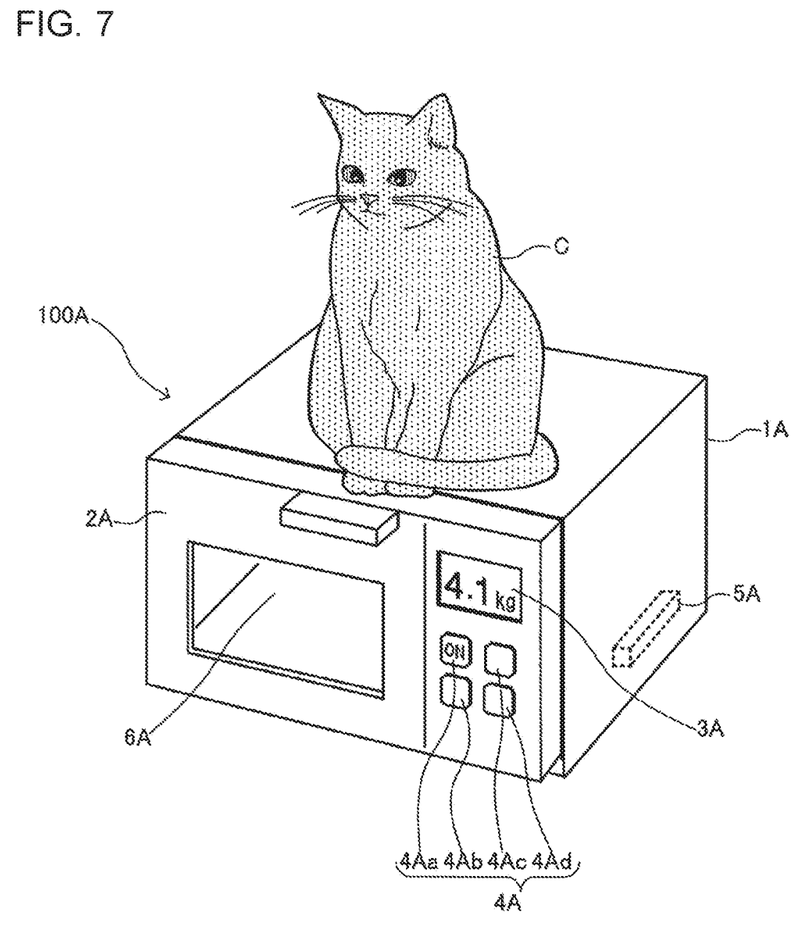
FIG. 7 is a schematic diagram schematically giving an idea of the weight detection operation by the heating/cooking device according to Embodiment 1 of the present invention.

(Step S3 in FIG. 3, FIG. 7)

When the weight of the cat C is measured, the controller 5A causes the display unit 3A to display a measurement result. A series of processes in the weight detection operation is then ended.

According to the above, there is no mix-up between a case where a user instruction is issued to perform a basic operation that is a primary function of the heating/cooking device 100A, that is, a heating operation, and a case where a user instruction is issued to perform the weight detection operation. Accordingly, the heating operation and the weight detection operation may be performed without being mixed up with one another. Furthermore, the weight detection operation may be implemented without adding a new key. Still further, by using keys that are not a trigger for the heating operation, the heating operation may be prevented from being performed by mistake. Note that the two keys are not limited to the keys mentioned above.

Furthermore, with the heating/cooking device 100A, weight measurement may be performed when the cat C voluntarily gets on the top part 7A. Accordingly, one does not have to go through the trouble of putting the cat C on a weight scale, and also, the weight may be measured in a state where the cat C is staying still. Therefore, with the heating/cooking device 100A, the weight of the cat C may be easily and accurately measured. Health of the cat C may thus be easily managed. Moreover, in addition to the cat C, a weight of a thing necessary in cooking, such as seasoning, may be easily measured.

<Modification of Heating/Cooking Device 100A>

Figure 8:
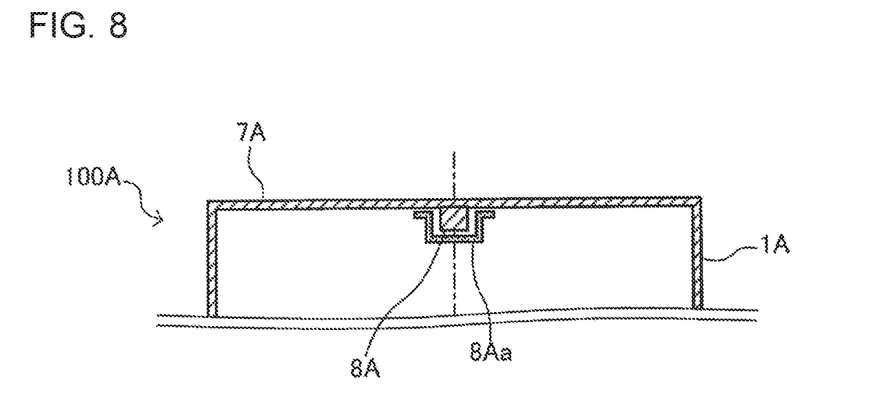
FIG. 8 is a cross-sectional view schematically showing a cross-sectional configuration of a part of a modification of the heating/cooking device according to Embodiment 1 of the present invention.

FIG. 8 is a cross-sectional view schematically showing a cross-sectional configuration of a part of a modification of the heating/cooking device 100A. With the heating/cooking device 100A shown in FIG. 8, the weight measurement unit 8A is covered by a heat-resistant cover 8Aa that is a heat-resistant part.

When the heating/cooking device 100A is normally used and a heating operation is performed, temperature inside of the main body 1A is conceivably increased. Accordingly, the heat-resistant cover 8Aa is provided so that a function of the weight measurement unit 8A is not impaired, and the weight measurement unit 8A is thereby protected. Note that a material of the heat-resistant cover 8Aa is not particularly limited so long as the material is heat-resistant. Moreover, size and shape of the heat-resistant cover 8Aa may be determined according to sizes and shapes of the main body 1A and the weight measurement unit 8A.

<Other Modifications of Heating/Cooking Device 100A>

In the example described above, a case is described where the weight detection operation is performed by operation of two existing keys on the operation unit 4A; however, a weight detection start key as a trigger for starting the weight detection operation may be provided as one of the keys on the operation unit 4A. In this case, a function for starting the weight detection operation does not have to set in other keys on the operation unit 4A.

Furthermore, the weight detection operation may be automatically performed when a pet is detected by the controller 5A of the heating/cooking device 100A to have gotten on the top part 7A. For example, weight measurement by the weight measurement unit 8A may be performed constantly or for a specific period of time, and the controller 5A may start measurement of the weight in a case where a change in the weight is detected.

In both cases, the controller 5A preferably does not perform the heating operation in a case where the measured weight is equal to or greater than a reference weight, such as 2.5 kg, for example. In the case where the weight is 2.5 kg or more, it is highly likely that a pet is on the top part 7A. Accordingly, by providing a threshold in relation to a measured weight, a pet may be protected from an increase in the temperature due to the heating operation, and safety of the pet may be secured.

Furthermore, the heating/cooking device 100A may be provided with a communication unit capable of communicating with an external terminal and may be capable of transmitting a measurement result to the external terminal. Moreover, the controller 5A may start the weight detection operation in response to an instruction from the external terminal. The external terminal is a mobile phone, a smartphone, a tablet, or a PC, for example. In a case where the heating/cooking device 100A is capable of communicating with the external terminal, a user may easily and swiftly check a change in the weight of the pet even when the user is at a remote place. In this case, a dedicated application is desirably downloadable in the external terminal. When the dedicated application is used, a change in the weight of the pet may be even more easily and swiftly checked.

Embodiment 2

Figure 9:
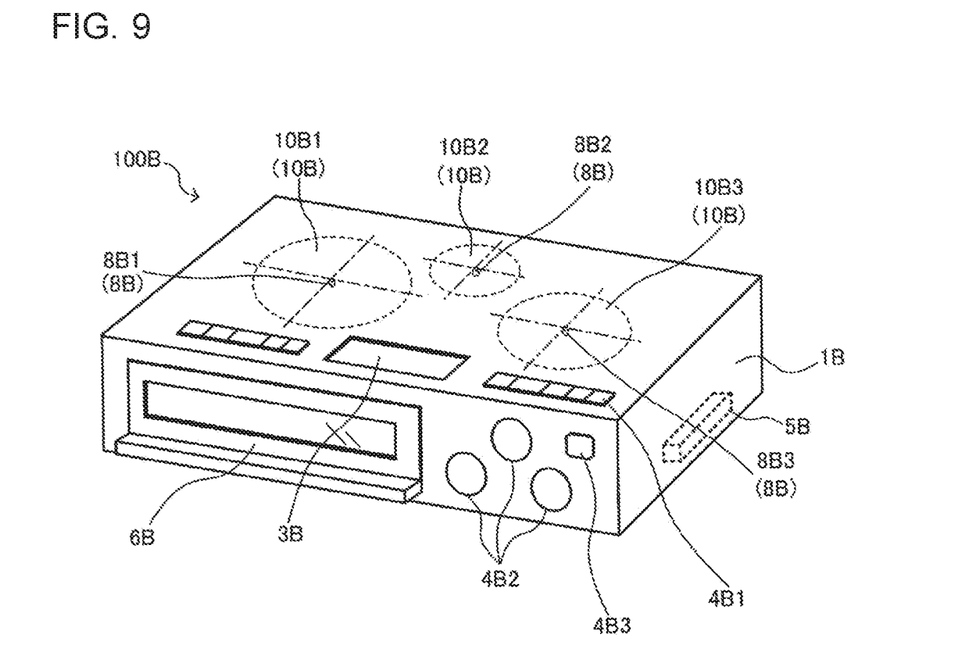
FIG. 9 is a schematic perspective view schematically showing an example of a configuration of a heating/cooking device according to Embodiment 2 of the present invention.
Figure 10:
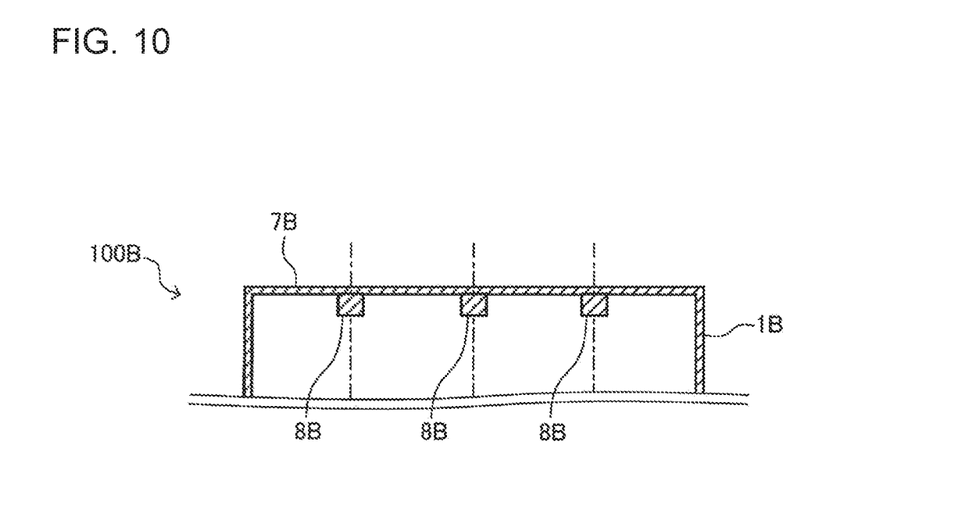
FIG. 10 is a cross-sectional view schematically showing a cross-sectional configuration of a part of the heating/cooking device according to Embodiment 2 of the present invention.

FIG. 9 is a schematic perspective view schematically showing an example of a configuration of a heating/cooking device 100B according to Embodiment 2 of the present invention. FIG. 10 is a cross-sectional view schematically showing a cross-sectional configuration of a part of the heating/cooking device 100B. The heating/cooking device 100B will be described with reference to FIGS. 9 and 10. In Embodiment 2, a description will be given mainly of differences from Embodiment 1, and parts the same as those in Embodiment 1 will be denoted by same reference signs, and redundant description will be omitted. The heating/cooking device 100B is an IH cooking heater that is one of home electric appliances according to the present invention.

The heating/cooking device 100B is generally used by being installed in a kitchen. As shown in FIG. 9, the heating/cooking device 100B includes a main body 1B that has a shape of a box that is open at a top, and a top part 7B that is attached on an upper side of the main body 1B.

Furthermore, although not an essential part, the heating/cooking device 100E includes a grill 6B that is provided in a manner capable of being pulled out forward from the main body 1B.

A heating unit is provided inside the main body 1B, the heating unit being provided with an induction heating coil for heating a heating target object that is placed on the top part 7B, for example.

The top part 7B covers the top of the main body 1B and includes heat-resistant glass. Heating target object placement parts 10B are formed on a surface of the top part 7B, the number of heating target object placement parts 10B corresponding to the number of heating units provided on the main body 1B. In FIG. 9, three heating target object placement parts 10B are shown, in the order of a heating target object placement part 10B1, a heating target object placement part 10B2, and a heating target object placement part 10B3 from a left side on the page. Note that the heating target object placement parts 10B are not essential, and also, the number of heating target object placement parts 10B is not restrictive.

The heating unit is disposed below the heating target object placement part 10B provided on the top part 7B. The heating unit includes an induction heating coil that is installed on a coil base and heats a heating target object by a controller 5B provided with an inverter circuit and the like. Specifically, the heating unit generates an eddy current by magnetic field lines generated by a current, in a heating target object such as a pot or a frying pan that is placed on an upper side of the heating unit across the top part 7B, and heats the heating target object by making the heating target object generate heat.

The heating target object placement part 10B is provided at a position corresponding to the heating unit installed on the main body 1B, or in other words, a position indicating a heating region, in the form of a circular mark, for example. The heating target object placement part 10B may be provided on the top part 7B by printing or painting, for example.

A display unit 3B configured to display various pieces of information is provided at a center on a forward side of the top part 7B. Furthermore, operation units 4B1 configured to receive various operations related to heating control are provided on both sides of the display unit 3A on the forward side of the top part 7B. Operation units 4B2 configured to receive various operations related to heating control are also provided on a front surface of the main body 1B. A start key 4B3 is also provided on the front surface of the main body 1B. Note that a configuration of the display unit 3B, the operation units 4B1, the operation units 4B2, and the start key 4B3 is not limited to the configuration shown in the drawing.

The grill 6B is for grilling a heating target object such as fish and is configured to be pulled out forward from the main body 1B. A grill heating unit as a heat source for heating an object to be cooked that is placed inside a compartment is provided inside the grill 6B. The grill heating unit is a sheath heater or the like and is disposed on at least one of an upper part and a lower part inside the grill 6B. An induction heating coil may alternatively be used as the grill heating unit. Furthermore, the grill heating unit may use a hot air circulation method called convection.

Furthermore, a weight measurement unit 8B is installed on a lower side of the top part 7B, or in other words, a back surface of the top part 7B that is positioned inside the main body 1B. As shown in FIG. 9, the weight measurement unit 8B is installed at a center of the heating target object placement part 10B. In FIG. 9, three weight measurement units 8B are shown, in the order of a weight measurement unit 8B1, a weight measurement unit 8B2, and a weight measurement unit 8B3 from a left side on the page. The weight measurement unit 8B measures a weight of a measurement target object that is placed on the top part 7B. Measurement information from the weight measurement unit 8B is transmitted to the controller 5B. The weight measurement unit 8B may be a weight sensor. Note that the weight measurement unit 8B does not have to be installed exactly at the center of the heating target object placement part 10B.

The controller 5B controls operation of the heating unit and the grill 6B on the basis of operation of the operation unit 4B. Furthermore, the controller 5B measures a weight of a measurement target object on the basis of measurement information from the weight measurement unit 8B. The controller 5B is hardware such as a circuit device, or software that is executed on an arithmetic device such as a CPU.

A weight detection operation by the heating/cooking device 100B will be described. Here, a case where the heating/cooking device 100B performs the weight detection operation in response to a user instruction will be described. The heating/cooking device 100B is assumed to start the weight detection operation with simultaneous operation of two keys of the operation unit 4B1, the operation unit 4B2 and the start key 4B3, such as the operation unit 4B1 and the start key 4B3, as a trigger.

For example, the cat C gets on the top part 7B of the heating/cooking device 100B, or a user places an object, a weight of which the user wants to know, on the top part 7B. The user operates the operation unit 4B1 and the start key 4B3 at the same time, after confirming that a measurement target object is on the top part 7B. That is, the user U presses the operation unit 4B1 and the start key 4B3 at the same time. The heating/cooking device 100B starts the weight detection operation with simultaneous operation of the two keys as a trigger. During the weight detection operation, the controller 5B may display, on the display unit 3B, an image indicating that the weight detection operation is being performed.

When the weight of the measurement target object is measured, the controller 5B causes the display unit 3B to display a measurement result. A series of processes in the weight detection operation is then ended.

According to the above, there is no mix-up between a case where a user instruction is issued to perform a basic operation that is a primary function of the heating/cooking device 100B, that is, a heating operation, and a case where a user instruction is issued to perform the weight detection operation. Accordingly, the heating operation and the weight detection operation may be performed without being mixed up with one another. Furthermore, the weight detection operation may be implemented without adding a new key. Still further, by using keys that are not a trigger for the heating operation as the keys as the trigger for the weight detection operation, the heating operation may be prevented from being started by mistake when the keys as the trigger for the weight detection operation are pressed. Note that the two keys as the trigger for the weight detection operation are not limited to the keys mentioned above.

Furthermore, with the heating/cooking device 100B, weight measurement may be performed when the cat C voluntarily gets on the top part 7B. Accordingly, one does not have to go through the trouble of putting the cat C on a weight scale, and also, the weight may be measured in a state where the cat C is staying still. Therefore, with the heating/ cooking device 100B, the weight of the cat C may be easily and accurately measured. Health of the cat C may thus be easily managed. Moreover, a weight of a thing necessary in cooking, such as seasoning, may be easily measured.

Embodiment 3

Figure 11:
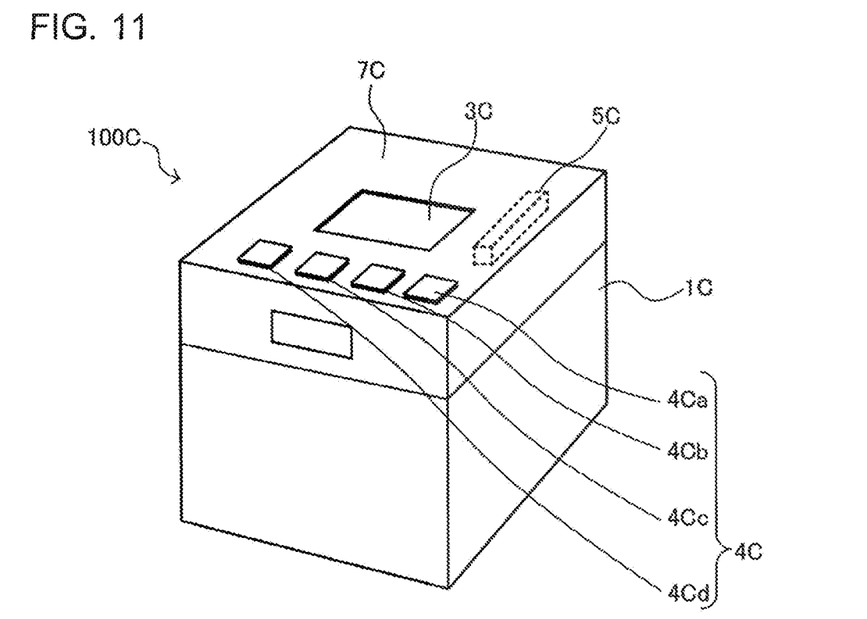
FIG. 11 is a schematic perspective view schematically showing an example of a configuration of a heating/cooking device according to Embodiment 3 of the present invention.
Figure 12:
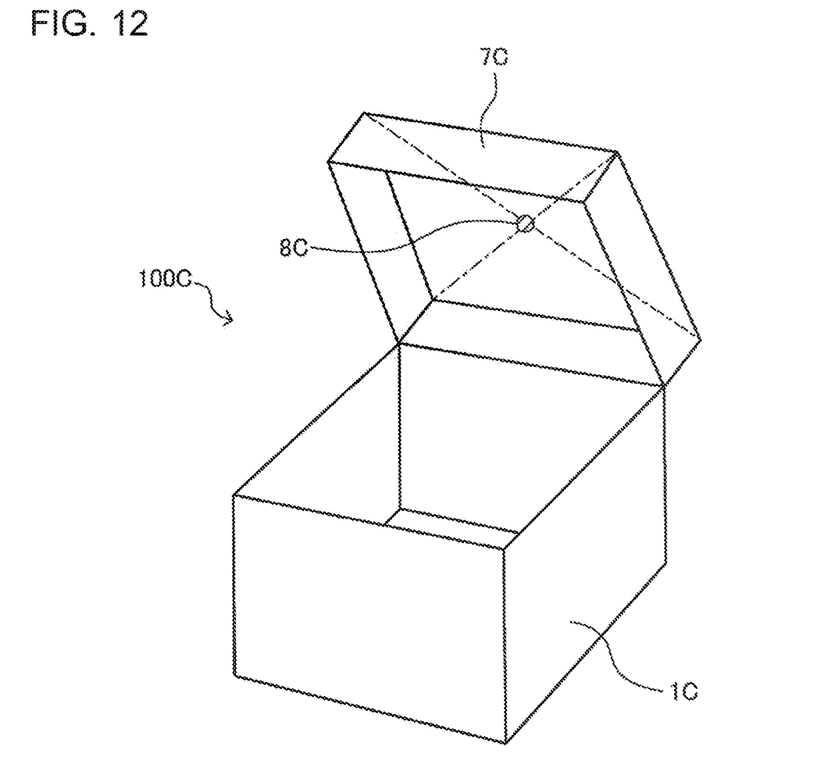
FIG. 12 is a schematic perspective view schematically showing a state where a top part of the heating/cooking device according to Embodiment 3 of the present invention is open.

FIG. 11 is a schematic perspective view schematically showing an example of a configuration of a heating/cooking device 100C according to Embodiment 3 of the present invention. FIG. 12 is a schematic perspective view schematically showing a state where a top part 7C of the heating/cooking device 100C is open. The heating/cooking device 100C will be described with reference to FIGS. 11 and 12. In Embodiment 3, a description will be given mainly of differences from Embodiment 1 and Embodiment 2, and parts the same as those in Embodiment 1 and Embodiment 2 will be denoted by same reference signs, and redundant description will be omitted. The heating/cooking device 100C is a rice cooker that is one of home electric appliances according to the present invention.

The heating/cooking device 100C cooks food by heating an inner pot where food such as rice is put in. As shown in FIG. 11, an exterior of the heating/cooking device 100C includes a main body 1C, and a top part 7C as an outer lid. The inner pot is a part that is used at the time of basic operation of the heating/cooking device 100C.

A heating coil or the like for cooking rice through induction heating of the inner pot housed in the main body 1C is provided inside the main body 1C. The heating coil heats the inner pot by a controller 5C provided with an inverter circuit and the like. Specifically, the heating coil generates an eddy current by magnetic field lines generated by a current, in the inner pot, and heats food in the inner pot through the inner pot.

The top part 7C covers a top of the main body 1C in a manner allowing the main body 1C to be opened/closed. A weight measurement unit 8C is installed on a lower side of the top part 7C, that is, a back surface, of the top part 7C, positioned inside the main body 1C.

A display unit 3C configured to display various pieces of information is provided at a center of the top part 7C. Furthermore, an operation unit 4C configured to receive various operations related to heating control is provided on a forward side of the top part 7C. The operation unit 4C is provided with various operation keys including a start key 4Ca, a cancel key 4Cb, a menu selection key 4Cc, and a heating time key 4Cd. Note that a configuration of the display unit 3C and the operation unit 4C is not limited to the configuration shown in the drawing.

As shown in FIG. 12, the weight measurement unit 8C is installed at a center of the back surface of the top part 7C. The weight measurement unit 8C measures a weight of a measurement target object that is placed on the top part 7C. Measurement information from the weight measurement unit 8C is transmitted to the controller 5C. The weight measurement unit 8C may be a weight sensor. Note that the weight measurement unit 8C does not have to be installed exactly at the center of the back surface of the top part 7C.

The controller 5C controls operation of the heating coil on the basis of operation of the operation unit 40. Furthermore, the controller 5C measures a weight of a measurement target object on the basis of measurement information from the weight measurement unit 8C. The controller 5C is hardware such as a circuit device, or software that is executed on an arithmetic device such as a CPU.

A weight detection operation by the heating/cooking device 100C will be described. Here, a case where the heating/cooking device 100C performs the weight detection operation in response to a user instruction will be described. Furthermore, the heating/cooking device 100C is assumed to start the weight detection operation with simultaneous operation of two keys of the operation unit 4C, such as the cancel key 4Cb and the heating time key 4Cd, as a trigger.

For example, the cat C gets on the top part 7C of the heating/cooking device 100C, or a user places an object, a weight of which the user wants to know, on the top part 7C. The user operates the cancel key 4Cb and the heating time key 4Cd at the same time, after confirming that a measurement target object is on the top part 7C. That is, the user U presses the cancel key 4Cb and the heating time key 4Cd at the same time. The heating/cooking device 100C starts the weight detection operation with simultaneous operation of the two keys as a trigger. During the weight detection operation, the controller 5C may display, on the display unit 3C, an image indicating that the weight detection operation is being performed.

When the weight of the measurement target object is measured, the controller 5C causes the display unit 3C to display a measurement result. A series of processes in the weight detection operation is then ended.

According to the above, there is no mix-up between a case where a user instruction is issued to perform a basic operation that is a primary function of the heating/cooking device 100C, that is, a heating operation, and a case where a user instruction is issued to perform the weight detection operation. Accordingly, the heating operation and the weight detection operation may be performed without being mixed up with one another. Furthermore, the weight detection operation may be implemented without adding a new key. Still further, by using keys that are not a trigger for the heating operation as the keys as the trigger for the weight detection operation, the heating operation may be prevented from being started by mistake when the keys as the trigger for the weight detection operation are pressed. Note that the two keys as the trigger for the weight detection operation are not limited to the keys mentioned above.

Furthermore, with the heating/cooking device 100C, weight measurement may be performed when the cat C voluntarily gets on the top part 7C. Accordingly, one does not have to go through the trouble of putting the cat C on a weight scale, and also, the weight may be measured in a state where the cat C is staying still. Therefore, with the heating/cooking device 100C, the weight of the cat C may be easily and accurately measured. Health of the cat C may thus be easily managed. Moreover, a weight of a thing necessary in cooking, such as seasoning, may be easily measured. Moreover, when one wants to freeze and preserve rice in a desired amount of portions after cooking the rice, a weight of the rice may be easily measured.

Performance of the weight detection operation is desirably enabled when the top part 7C is closed in a state where the inner pot is removed from the main body 1C, or in other words, in a state where a basic operation is not possible. This prevents a rice-cooking operation and the weight detection operation from being mixed up with each other.

The embodiments of the present invention have been separately described, but the present invention is not limited to the contents described in the embodiments, and various modifications and applications are possible within the scope of the present invention. The home electric appliances according to the present invention include, in addition to the home electric appliances described in the embodiments, an air-conditioning device installed in a room, a dehumidifier, a humidifier, a refrigerator and the like, top surfaces of which become warm. Furthermore, the heat-resistant cover 8Aa and the communication unit described in Embodiment 1 may be applied to Embodiment 2 and Embodiment 3.

REFERENCE SIGNS LIST 1A main body 1B main body 1C main body 2A door 3A display unit 3B display unit 3C display unit 4A operation unit 4Aa start key 4Ab cancel key 4Ac menu selection key 4Ad heating time key 4B operation unit 4B1 operation unit 4B2 operation unit 4B3 start key 4C operation unit 4Ca start key 4Cb cancel key 4Cc menu selection key 4Cd heating time key 5A controller 5B controller 5C controller 6A heating compartment 6B grill 7A top part 7B top part 7C top part 8A weight measurement unit 8Aa heat-resistant cover 8B weight measurement unit 8B1 weight measurement unit 8B2 weight measurement unit 8B3 weight measurement unit 8C weight measurement unit 10B heating target object placement part 10B1 heating target object placement part 10B2 heating target object placement part 10B3 heating target object placement part 100A heating/cooking device 100B heating/cooking device 100C heating/cooking device C cat U user

The invention claimed is:

1. A home electric appliance with heating function having a main body, a top part of which becomes warmer as a result of a heating operation, the home electric appliance comprising:
 a weight measurement unit configured to measure a weight of a measurement target object placed on the top part, and to output measurement information;
 a controller configured to perform a weight detection operation of detecting the weight of the measurement target object based on the measurement information from the weight measurement unit, and
 a plurality of operation units,
 wherein
 the top part includes a back surface that faces an inside of the main body, and
 the weight measurement unit is installed on the back surface of the top part,
 the plurality of operation units include
 a first operation unit configured to receive a start instruction in relation to the heating operation, and at least one second operation unit for an instruction other than the start instruction regarding the heating operation, and
 the controller starts the weight detection operation based on simultaneous operation of two or more of the at least one second operation units,
 wherein, the top part covers a top of the main body in a manner allowing the main body to be opened/closed, and a part that is used at a time of the basis operation is removable from the main body, the controller performs the weight detection operation when the top part is closed in a state where the part is removed.

2. The home electric appliance of claim 1, comprising a display unit configured to display the weight of the measurement target object, wherein,
 during the weight detection operation, the controller causes the display unit to perform display indicating that the weight detection operation is being performed.

3. The home electric appliance of claim 1, wherein the controller starts the weight detection operation in a case where there is a change in the measurement information from the weight measurement unit.

4. The home electric appliance of claim 1, wherein the weight measurement unit is installed at a center of the top part.

5. The home electric appliance of claim 1, wherein the weight measurement unit is covered by a heat-resistant cover.

6. The home electric appliance of claim 1, wherein the controller does not perform the heating operation in a case where the weight of the measurement target object is equal to or greater than a reference weight set in advance.

7. The home electric appliance of claim 1, comprising a communication unit capable of communicating with an external terminal, wherein
 the controller transmits information about the weight of the measurement target object to the external terminal via the communication unit.

8. The home electric appliance of claim 1, wherein the home electric appliance is a heating/cooking device, an air-conditioning device, a dehumidifier, a humidifier, or a refrigerator.

9. A home electric appliance with heating function having a main body, a top part of which becomes warmer as a result of a heating operation, the home electric appliance comprising:
 a weight measurement unit configured to measure a weight of a measurement target object placed on the top part, and to output measurement information;
 a controller configured to perform a weight detection operation of detecting the weight of the measurement target object based on the measurement information from the weight measurement unit,
 wherein
 the top part includes a back surface that faces an inside of the main body
 the weight measurement unit is installed on the back surface of the top part, and
 wherein
 the controller does not perform the heating operation in a case where the weight of the measurement target object is equal to or greater than a reference weight set in advance,
 the top part covers a top of the main body in a manner allowing the main body to be opened/closed, and a part that is used at a time of the heating operation is removable from the main body, the controller performs the weight detection operation when the top part is closed in a state where the part is removed.

10. The home electric appliance of claim 9, comprising a communication unit capable of communicating with an external terminal, wherein
 the controller transmits information about the weight of the measurement target object to the external terminal via the communication unit.

11. The home electric appliance of claim 9, wherein the home electric appliance is a heating/cooking device, an air-conditioning device, a dehumidifier, a humidifier, or a refrigerator.

* * * * *